(12) United States Patent
Liu

(10) Patent No.: US 6,834,460 B1
(45) Date of Patent: Dec. 28, 2004

(54) BOX TRAP

(76) Inventor: Kai-Chi Su Liu, 2F., No. 44, Lane 11, Kuang Fu N. Rd., Taipei (TW)

( * ) Notice: Subject to any disclaimer, the term of this patent is extended or adjusted under 35 U.S.C. 154(b) by 0 days.

(21) Appl. No.: 10/670,231

(22) Filed: Sep. 26, 2003

(51) Int. Cl.[7] .......................... A01M 23/20; A01M 23/16
(52) U.S. Cl. .............................................. 43/61
(58) Field of Search ....................... 43/60, 61

(56) References Cited

U.S. PATENT DOCUMENTS

| | | | | | |
|---|---|---|---|---|---|
| 298,361 | A | * | 5/1884 | Erling | 43/61 |
| 608,705 | A | * | 8/1898 | Neal | 43/61 |
| 866,987 | A | * | 9/1907 | Turner | 43/61 |
| 1,815,541 | A | * | 7/1931 | Bohannon | 43/61 |
| 2,616,210 | A | * | 11/1952 | Reeb | 43/61 |
| 2,717,471 | A | * | 9/1955 | Sullivan | 43/61 |
| 3,624,951 | A | * | 12/1971 | Gilbaugh | 43/61 |
| 3,834,063 | A | * | 9/1974 | Souza et al. | 43/61 |
| 3,913,258 | A | * | 10/1975 | Souza et al. | 43/61 |
| 4,912,872 | A | * | 4/1990 | Wynn et al. | 43/61 |
| 5,845,432 | A | * | 12/1998 | Tully et al. | 43/61 |
| 5,862,624 | A | * | 1/1999 | Askins | 43/61 |
| 5,864,982 | A | * | 2/1999 | Tully et al. | 43/61 |
| 6,588,139 | B2 | * | 7/2003 | Kao et al. | 43/61 |
| 6,609,327 | B2 | * | 8/2003 | Stoico et al. | 43/61 |

FOREIGN PATENT DOCUMENTS

| | | | |
|---|---|---|---|
| FR | 2728141 A1 | * | 6/1996 |
| GB | 2193425 A1 | * | 2/1988 |
| GB | 2366177 A1 | * | 3/2002 |
| JP | 7-147877 B1 | * | 6/1995 |
| JP | 2001-275545 B1 | * | 10/2001 |
| WO | WO-86/05657 A1 | * | 10/1986 |
| WO | WO-95/06406 A1 | * | 3/1995 |

* cited by examiner

Primary Examiner—Darren W. Ark
(74) Attorney, Agent, or Firm—Troxell Law Office PLLC

(57) ABSTRACT

A box trap formed of a bottom panel, a left panel, a right panel, an actuating frame, a linking rod, a front panel, a rear panel, and a top panel that are pivotally coupled to one another and fastened tight with screws and nuts such that the box trap is detachable.

2 Claims, 6 Drawing Sheets

องก์ BOX TRAP

BACKGROUND AND SUMMARY OF THE INVENTION

The present invention relates to a box trap and, more particularly, to a detachable box trap that can be arranged in a flat manner to reduce its packing size and delivery space.

Various box traps are well known. These conventional box traps are commonly not detachable, not convenient for carrying or storage. Because of being not detachable, conventional box traps require much packing material, and occupy much storage space during delivery.

The present invention has been accomplished under the circumstances in view. It is therefore the main object of the present invention to provide a box trap, which is detachable. According to the present invention, the box trap comprises a bottom panel, a left panel pivoted to the left side of the bottom panel, a right panel pivoted to the right side of the bottom panel, a rear panel pivoted to the rear side of the left panel and detachably fastened to the rear side of the right panel by screws and nuts, a top panel pivoted to the top side of the left panel and detachably fastened to the top side of the right panel by screws and nuts, a front panel pivoted to the top panel and turnable between the close position and the open position, a detachable actuating frame pivoted to the bottom panel, and a linking rod coupled to the actuating frame and adapted to hold the front panel in the open position and to let the front panel move to the close position upon an action of the actuating frame triggered by an animal entering the box trap.

DETAILED DESCRIPTION OF THE INVENTION

Figure 1:
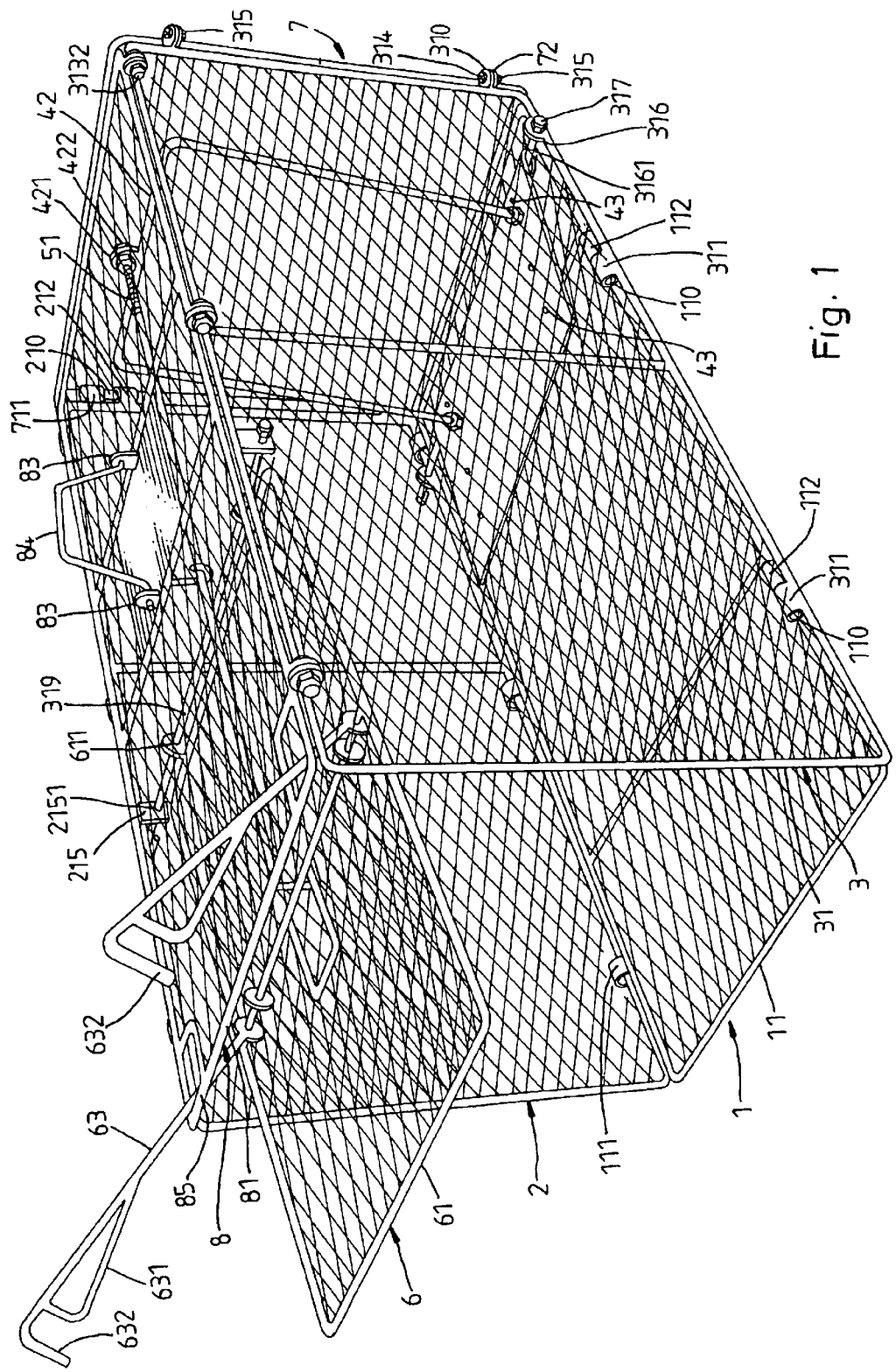
FIG. 1 is a perspective view showing the open status of the box trap according to the present invention.
Figure 2:
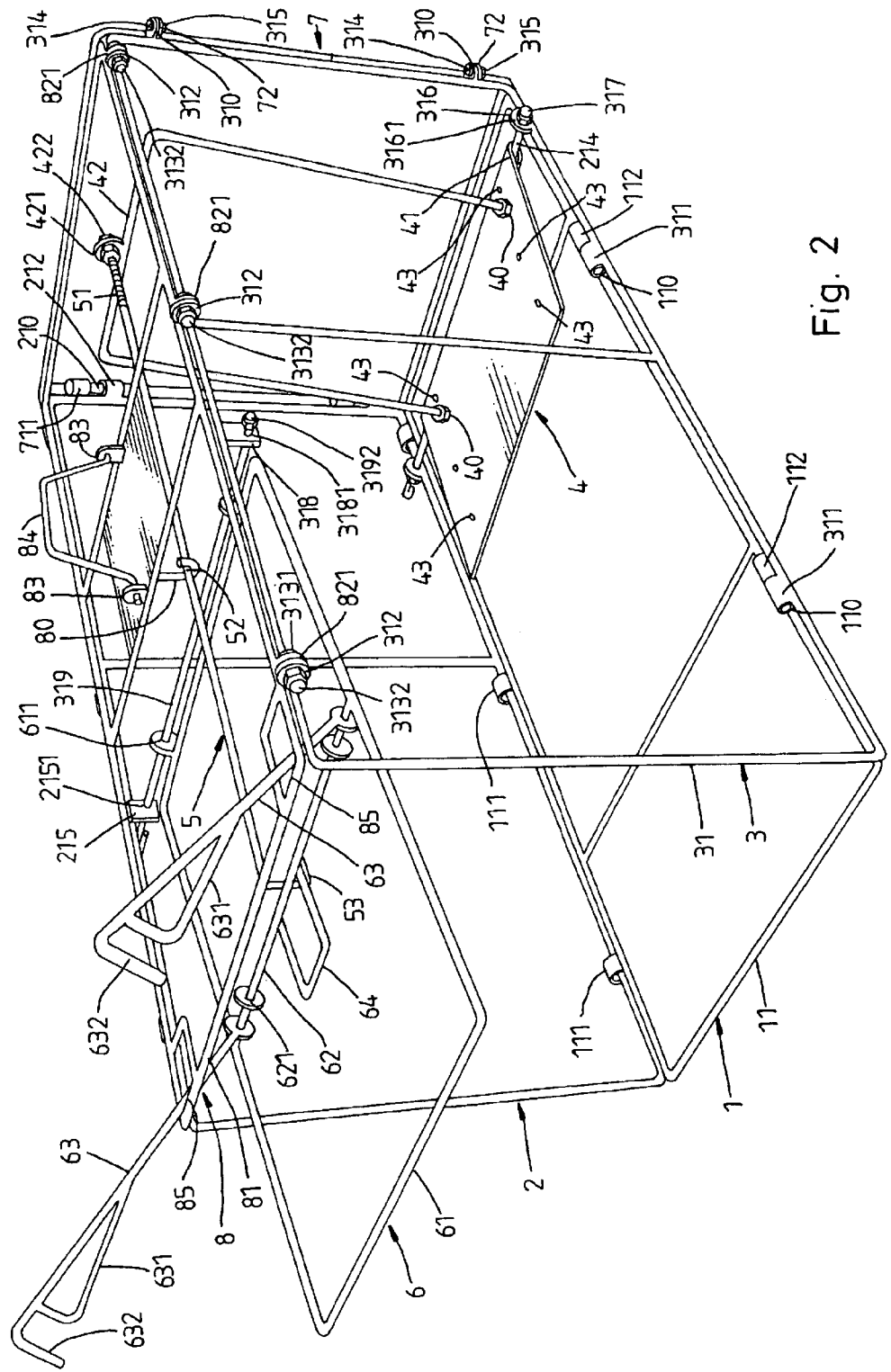
FIG. 2 is similar to FIG. 1 but showing the meshed structure removed from the box trap.
Figure 3:
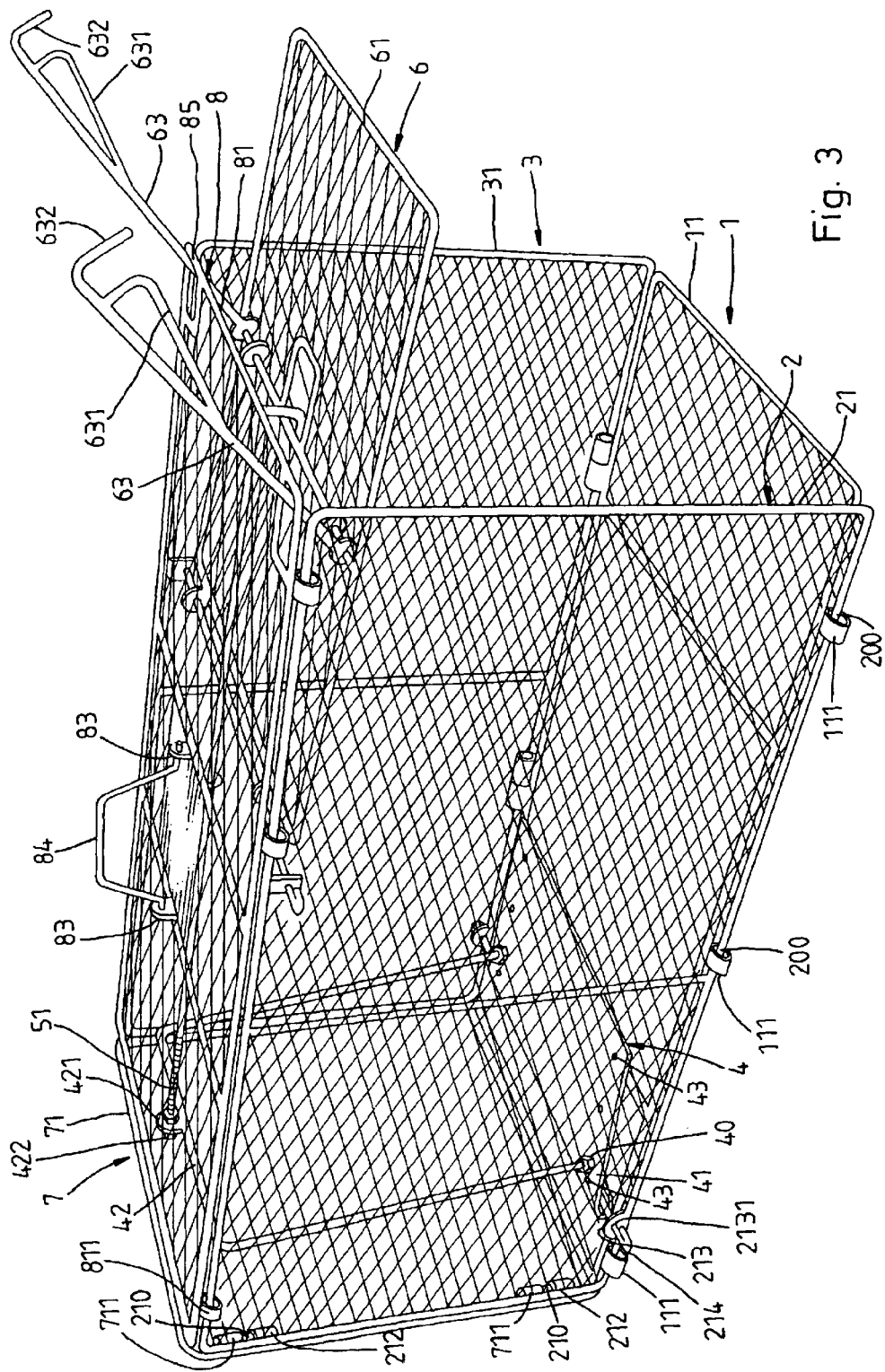
FIG. 3 is another perspective view of the box trap when viewed from another angle.
Figure 4:
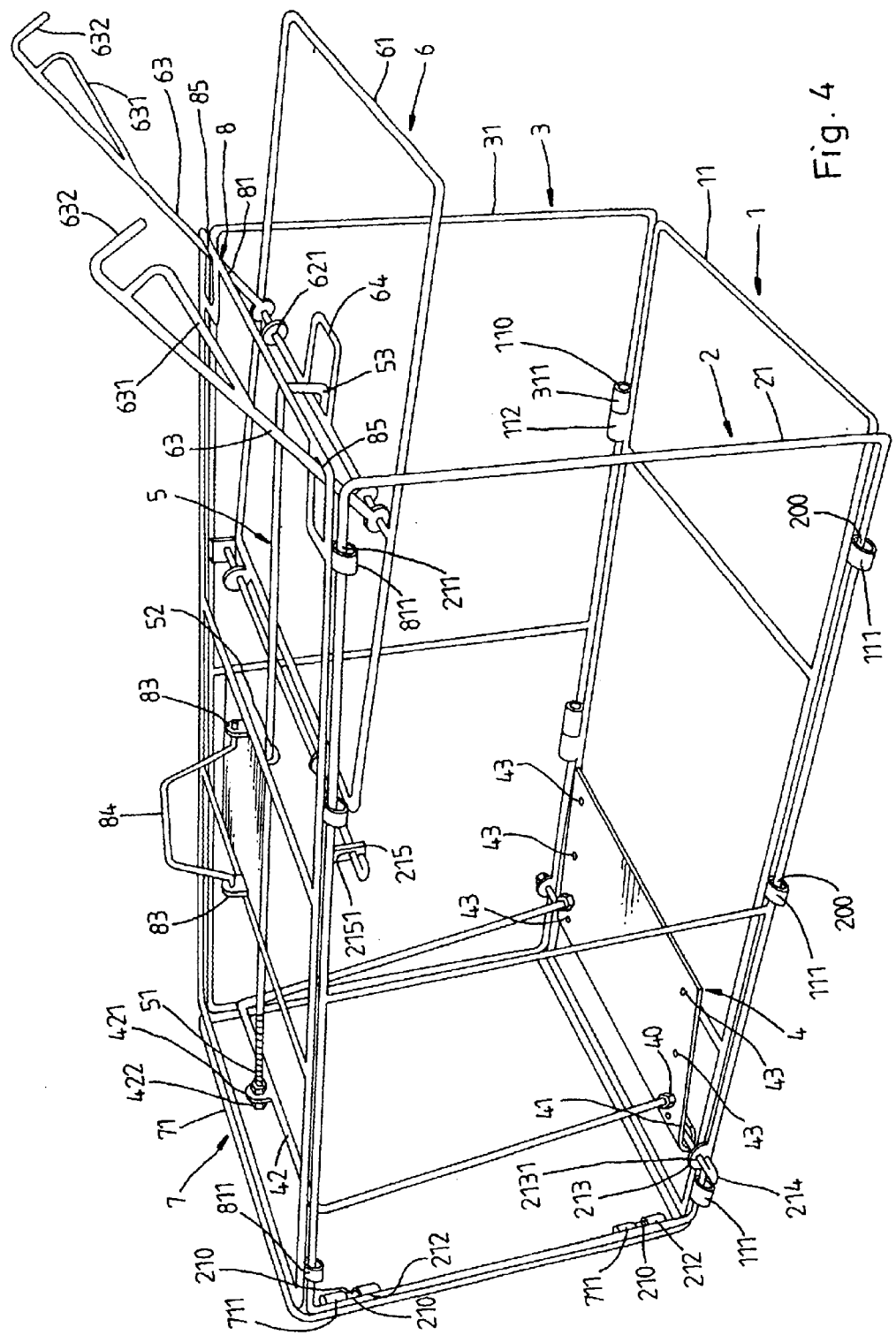
FIG. 4 is similar to FIG. 3 but showing the meshed structure removed from the box trap.
Figure 5:
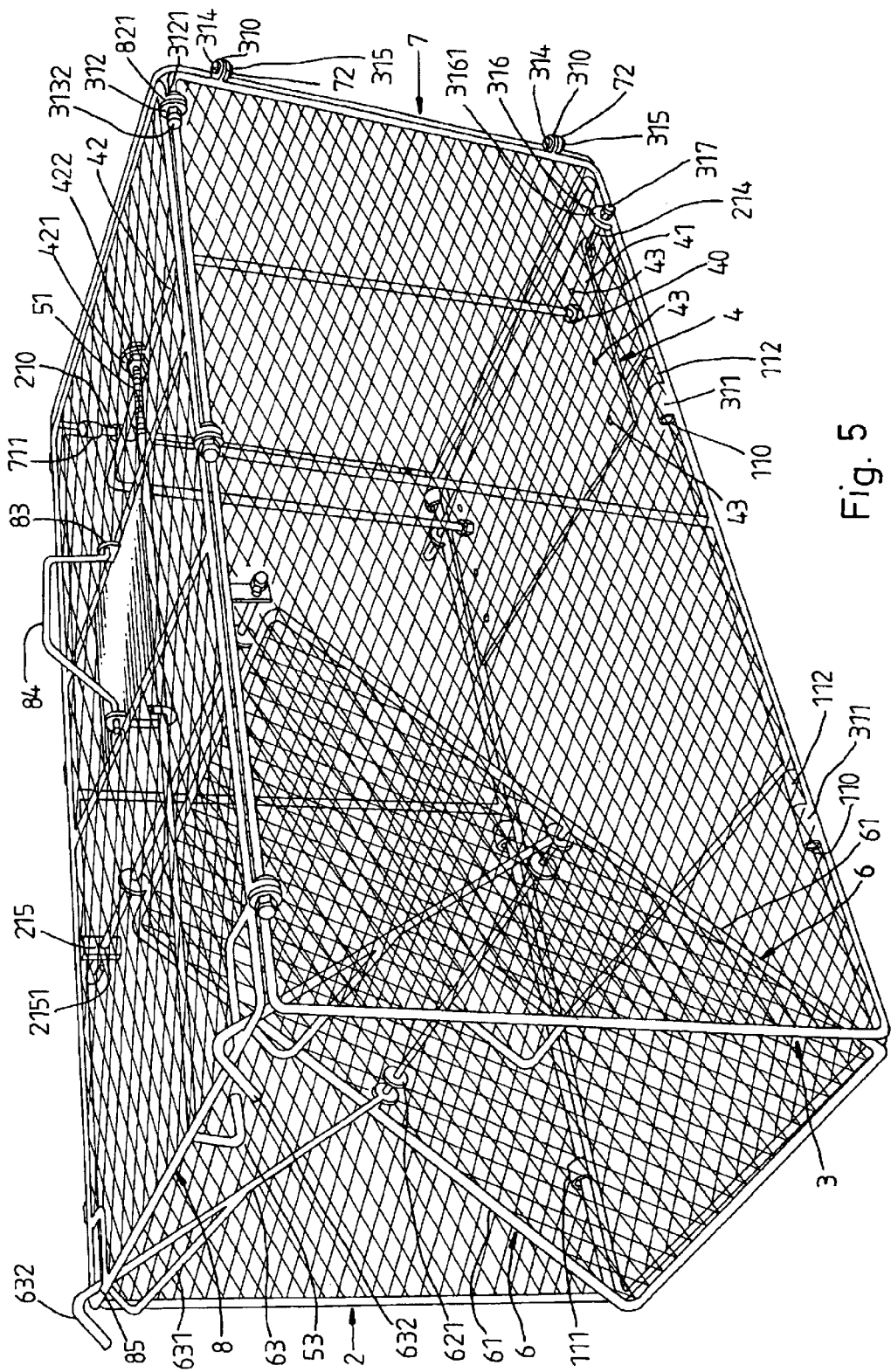
FIG. 5 is another perspective view of the preferred embodiment of the present invention, showing the closed status of the box trap.
Figure 6:
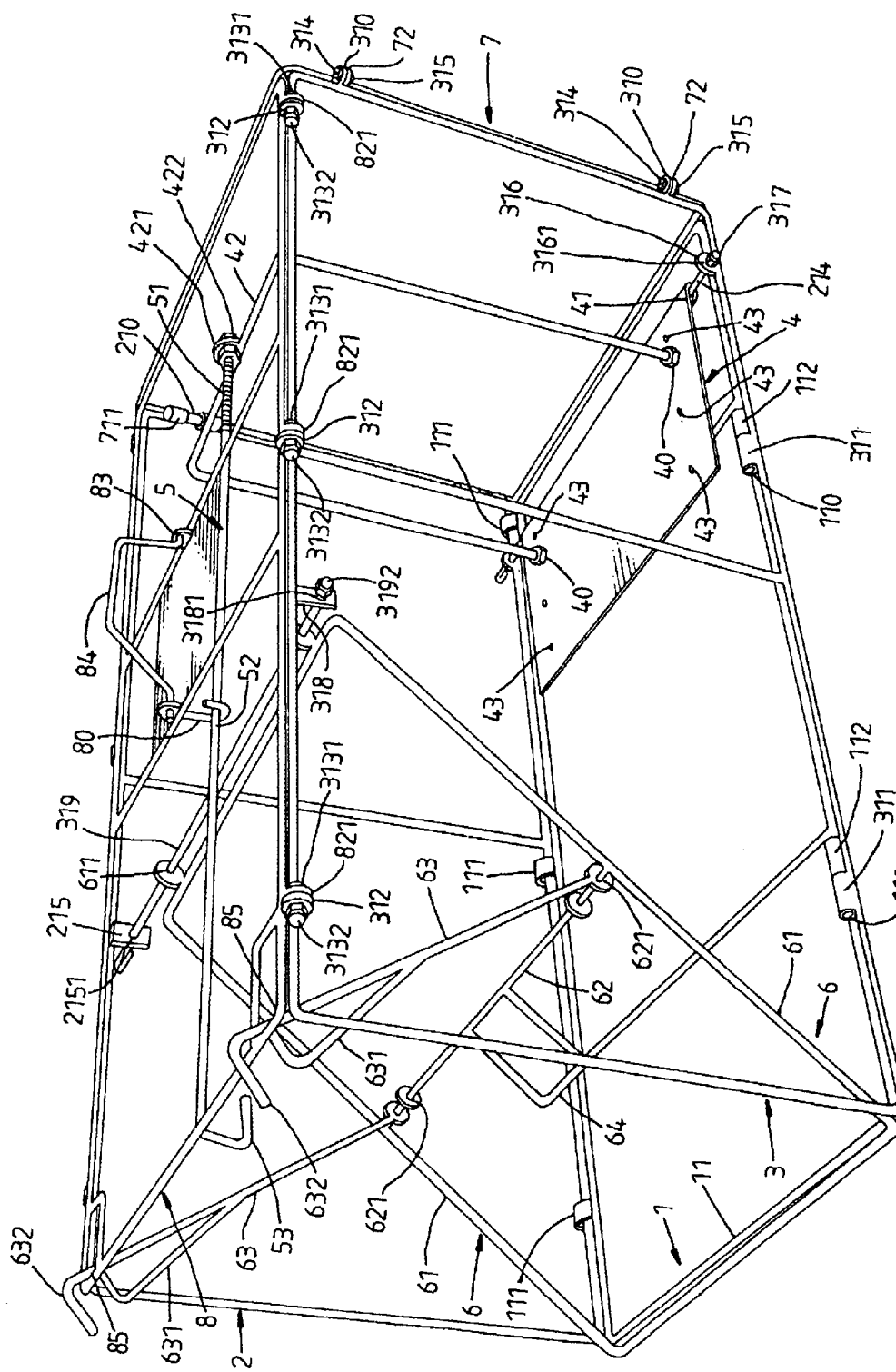
FIG. 6 is similar to FIG. 5 but showing the meshed structure removed from the box trap.

Referring to FIGS. 1~6, a box trap in accordance with the present invention is shown comprised of a bottom panel 1, a left panel 2, a right panel 3, an actuating frame 4, a linking rod 5, a front panel 6, a rear panel 7, and a top panel 8.

The bottom panel 1 is a meshed framework comprising a substantially rectangular open frame 11 formed of a metal wire rod, a plurality of barrels 111 aligned at one long side, namely, the left long side of the rectangular open frame 11 for the coupling of the left panel 2, and a plurality of barrels 112 aligned at the other long side, namely, the right long side of the rectangular open frame 11 for the coupling of the right panel 3.

The left panel 2 is a meshed framework comprising a substantially rectangular open frame 21, which has one long side, namely, the bottom long side 200 pivotally coupled to the barrels 111 of the bottom panel 1 and the other long side, namely, the top long side 211 pivotally coupled to the top panel 8 (see FIG. 4), a plurality of barrels 212 aligned at one short side, namely, the rear short side for the coupling of the rear panel 7, an upright bottom eye lug 213 disposed at the bottom long side 200 near the rear side and defining a through hole 2131 (see FIG. 4), and a top locating block 215 downwardly extended from the top long side 211 on the middle and defining a through hole 2151.

The right panel 3 is a meshed framework comprising a substantially rectangular open frame 31, a plurality of barrels 311 aligned at one long side, namely, the bottom long side and respectively pivotally coupled to the barrels 112 at the right long side of the rectangular open frame 11 of the bottom panel 1 by pivot pins 110, a plurality of top eye lugs 312 aligned at the other long side, namely, the top long side and respectively connected to the top panel 8, a plurality of rear eye lugs 310 aligned at one short side, namely, the rear short side and respectively connected to the rear panel 7, an upright bottom eye lug 316 disposed at the bottom long side near the rear side and defining a through hole 3161, and a top locating block 318 downwardly extended from the top long side on the middle and defining a through hole 3181.

A headed rod member 319 is inserted through the through hole 2151 of the top locating block 215 of the left panel 2 and the through hole 3181 of the top locating block 318 of the right panel 3, and then fastened up with a fastening member, for example, a cap nut 3192.

A headed rod member 214 is inserted through the through hole 2131 of the upright bottom eye lug 213 of the left panel 2 and the through hole 3161 of the upright bottom eye lug 316 of the right panel 3, and then fastened up with a fastening member, for example, a cap nut 317.

The actuating frame 4 comprises a barrel 41 transversely disposed at the rear side and pivotally coupled to the rod member 214 between the upright bottom eye lug 213 of the left panel 2, and the upright bottom eye lug 316 of the right panel 3, a substantially inverted U-shaped handle 42, which two bottom free ends respectively affixed to the actuating frame 4 by fastening devices 40, and a top eye lug 421 disposed at the top side of the inverted U-shaped handle 42 on the middle and fastened to the linking rod 5.

The linking rod 5 has a rear end 51 inserted through the top eye lug 421 of the actuating frame 4 and fastened thereto with a fastening member, for example, a cap nut 422, a middle part 52 coupled to the top panel 8, and a front end terminating in a hook 53 hooked on a part of the top panel 8.

The front panel 6 is a meshed framework, comprising a substantially rectangular open frame 61, a plurality of eye lugs 611 aligned at one short side, namely, the top short side and respectively pivotally coupled to the rod member 319 between the top locating block 215 of the left panel 2 and the top locating block 318 of the right panel 3, a transverse rod 62 connected between the two opposite long sides on the middle, two retainer rods 63 respectively pivotally coupled to the two ends 621 of the transverse rod 62 and obliquely upwardly extended through the top panel 8 and terminating in a guide portion 631 and a hooked portion 632 above the guide portion 631, and a locating ring 64 provided at the transverse rod 62 on the middle and adapted to receive the hook 53 of the linking rod 5.

The rear panel 7 is a meshed framework, comprising a substantially rectangular open frame 71, a plurality of barrels 711 aligned at one long side, namely, the left long side and respectively pivotally coupled to the barrels 212 of the left panel 2 by pivot pins 210, and a plurality of eye lugs 72 aligned at the other long side, namely, the right long side. The eye lugs 72 each define a through hole 721 respectively connected to the rear eye lugs 310 of the right panel 3 by a respective screw 314 and a respective nut 315.

The top panel 8 is a meshed framework, comprising a substantially rectangular open frame 81, a plurality of barrels 811 aligned at one long side, namely, the left long side and pivotally coupled to the top long side 211 of the left panel 2, a plurality of eye lugs 821 aligned at the other long side, namely, the right long side and respectively connected to the top eye lugs 312 of the right panel 3 by screws 3131 and nuts 3132, a hook 80 suspended on the middle and hooked on a middle part 52 of the linking rod 5, two top lugs 83 disposed on the middle, a carrying handle 84 pivoted to the top lugs 83, and two front rings 85 disposed at the ends of one short side, namely, the front short side and adapted to guide movement of the retainer rods 63 of the front panel 6.

When a squirrel, wild dog, or any of a variety of animals entered the box trap and stepped on the actuating frame 4, the actuating frame 4 is rotated about the rod member 214 to force the handle 42 to push the linking rod 5 forwards, thereby causing the hook 53 to be disconnected from the locating ring 64 of the front panel 6. At this time, the front panel 6 is forced by its gravity weight to turn about the rod member 319 from the open position shown in FIGS. 1~4 to the close position shown in FIGS. 5 and 6, to stop the caught animal from running out of the box trap. At the same time, the hooked portions 632 of the retainer rods 63 are respectively hooked in the front rings 85 of the top panel 8 to lock the front panel 6 to the top panel 8 in the close position.

When not in use, the fastening members 3131, 3132, 314, 315, 40, 422, 317, 319 are removed from the box trap, and then the box trap is collapsed and arranged in a flat manner to reduce its storage space for delivery.

Further, the linking frame 4 has pairs of mounting holes 43 for the mounting of the two bottom free ends of the handle 42 selectively. Therefore, the linking frame 4 can be selectively installed in the box trap in one of a series of tilting angles subject to the type of animals to catch.

A prototype of box trap has been constructed with the features of FIGS. 1~6. The box trap functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A box trap comprising:
   a meshed bottom panel, said bottom panel comprising a substantially rectangular open frame formed of a metal wire rod, a plurality of barrels respectively aligned at left and right long sides of the rectangular open frame of said bottom panel;
   a meshed left panel, said left panel comprising a substantially rectangular open frame, the rectangular open frame of said left panel having a bottom long side pivotally coupled to the barrels at the left long side of said bottom panel, a plurality of barrels aligned at a rear short side thereof, an upright bottom eye lug disposed at the bottom long side and defining a through hole, and a top locating block downwardly extended from a top long side thereof at a middle and defining a through hole;
   a meshed right panel, said right panel comprising a substantially rectangular open frame, a plurality of barrels aligned at a bottom long side of the rectangular open frame of said right panel and respectively pivotally coupled to the barrels at the right long side of the rectangular open frame of said bottom panel by pivot pins, a plurality of top eye lugs aligned at a top long side of the rectangular open frame of said right panel, a plurality of rear eye lugs aligned at a rear short side of the rectangular open frame of said right panel, an upright bottom eye lug disposed at the bottom long side of the rectangular open frame of said right panel near a rear side and defining a through hole, and a top locating block downwardly extended from the top long side of the rectangular open frame of said right panel at a middle and defining a through hole;
   a headed rod member inserted through the through hole of the top locating block of said left panel and the through hole of the top locating block of said right panel and then fastened up with a fastening member;
   a another headed rod member inserted through the through hole of the upright bottom eye lug of said left panel and the through hole of the upright bottom eye lug of said right panel and then fastened up with a fastening member;
   an actuating frame, said actuating frame comprising a barrel transversely disposed at a rear side thereof and pivotally coupled to the rod member between the upright bottom eye lug of said left panel and the upright bottom eye lug of said right panel, a substantially inverted U-shaped top handle, and a top eye lug disposed at a top side of said inverted U-shaped top handle at a middle;
   a linking rod, said linking rod having a rear end inserted through the top eye lug of said actuating frame and fastened thereto with a fastening member and a front end terminating in a hook;
   a meshed front panel, said front panel comprising a substantially rectangular open frame, a plurality of eye lugs aligned at a top short side of the rectangular open frame of said front panel and respectively pivotally coupled to the rod member between the top locating block of said left panel and the top locating block of said right panel, a transverse rod connected between two opposite long sides of the rectangular open frame of said front panel at a middle, two retainer rods respectively pivotally coupled to two distal ends of said transverse rod and each terminating in a guide portion and a hooked portion above said guide portion, and a locating ring provided at said transverse rod at a middle and adapted to receive the hook of said linking rod;
   a meshed rear panel, said rear panel comprising a substantially rectangular open frame, a plurality of barrels aligned at a left long side of the rectangular open frame of said rear panel and respectively pivotally coupled to the barrels of said left panel by pivot pins, and a plurality of eye lugs aligned at a right long side of the rectangular open frame of said rear panel, the eye lugs of said rear panel each having a through hole respectively connected to the rear eye lugs of said right panel by a respective screw and a respective nut; and
   a meshed top panel, said top panel comprising a substantially rectangular open frame, a plurality of barrels aligned at a left long side of the rectangular open frame of said top panel and pivotally coupled to the top long side of said left panel, a plurality of eye lugs aligned at a right long side of the rectangular open frame of said top panel and respectively connected to the top eye lugs of said right panel by screws and nuts, a hook suspended at a middle thereof and hooked on a middle part of said linking rod for enabling said linking rod to be moved back and forth horizontally, a carrying handle, and two front rings disposed at two distal ends of a front short side of the rectangular open frame of said top panel and adapted to guide movement of said retainer rods of said front panel and to hook up with the hooked portions of said retainer rods.

2. The box trap as claimed in claim 1, wherein said actuating frame comprises a plurality of mounting holes symmetrically aligned in two parallel, rows in front of the barrel of said actuating frame; said inverted U-shaped top handle has two bottom ends selectively fastened to said mounting holes by fastening devices.

* * * * *